United States Patent
Herrera

(10) Patent No.: US 6,408,842 B1
(45) Date of Patent: Jun. 25, 2002

(54) OVEN

(76) Inventor: Alfred Herrera, 13002 Lantern La., La Mirada, CA (US) 90638

( * ) Notice: Subject to any disclaimer, the term of this patent is extended or adjusted under 35 U.S.C. 154(b) by 0 days.

(21) Appl. No.: 09/538,601

(22) Filed: Mar. 29, 2000

(51) Int. Cl.[7] .............................. A21B 1/02; A21B 1/42
(52) U.S. Cl. .................................. 126/41 C; 99/443 C
(58) Field of Search ............................ 126/21 A, 39 E, 126/41 C; 99/443 C; 110/255; 432/146, 147; 34/215, 216; 431/89, 278

(56) References Cited

U.S. PATENT DOCUMENTS

| | | | | |
|---|---|---|---|---|
| 1,458,021 A | * | 6/1923 | Bamford | 99/443 C |
| 2,670,790 A | * | 3/1954 | Marble | 431/278 |
| 3,372,635 A | * | 3/1968 | Meyer | 99/443 C |
| 3,478,704 A | * | 11/1969 | Ford | 426/502 |
| 3,622,257 A | * | 11/1971 | Hein et al. | 431/278 |
| 4,583,451 A | * | 4/1986 | Kanagy | 99/443 C |
| 4,726,766 A | * | 2/1988 | Stewart et al. | 126/21 A |
| 5,429,111 A | * | 7/1995 | Akamatsu | 126/39 E |

FOREIGN PATENT DOCUMENTS

| | | | | |
|---|---|---|---|---|
| AU | 157926 | * | 8/1952 | 99/443 C |
| GB | 722711 | * | 1/1955 | 431/278 |

* cited by examiner

*Primary Examiner*—Sara Clarke
(74) *Attorney, Agent, or Firm*—Myers Dawes & Andras; Joseph C. Andras; Vic Y. Lin

(57) ABSTRACT

An oven includes single or multiple decks of longitudinal burners extending from an infeed end to an outfeed end of a body. The burners are slanted relative to a direction of a movable carrier such that a product traveling on the carrier will be heated continuously from one side to the other by a burner whose orientation is diagonal to the product's path of travel. The proportion of air and gas may be separately controlled for each deck. Furthermore, each burner may be individually controlled and monitored to maintain a desired temperature within the body. Latitudinal pilot runners extend across the width of the oven to ignite and maintain the longitudinal burners. Infrared burners above the top deck initially heat a product to either seal in or eliminate moisture. The invention further comprises a method for heating a product.

6 Claims, 8 Drawing Sheets

FIG. I

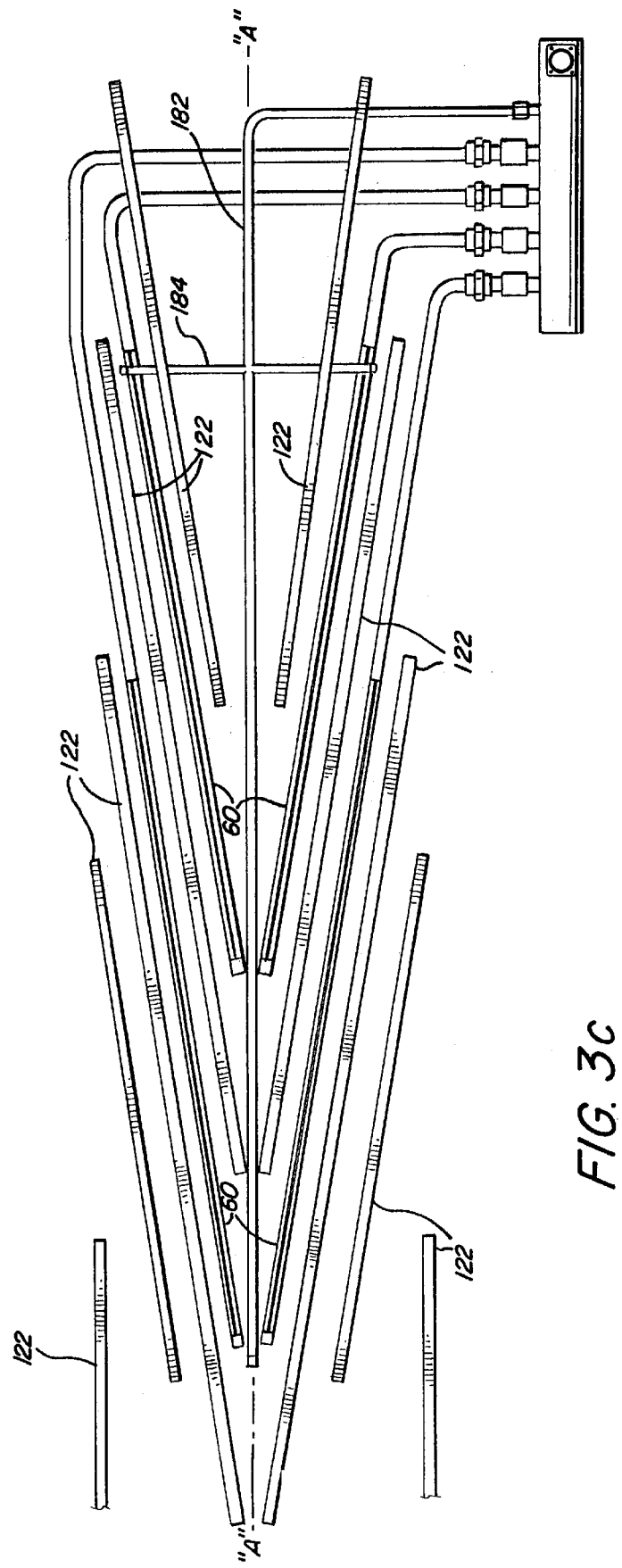

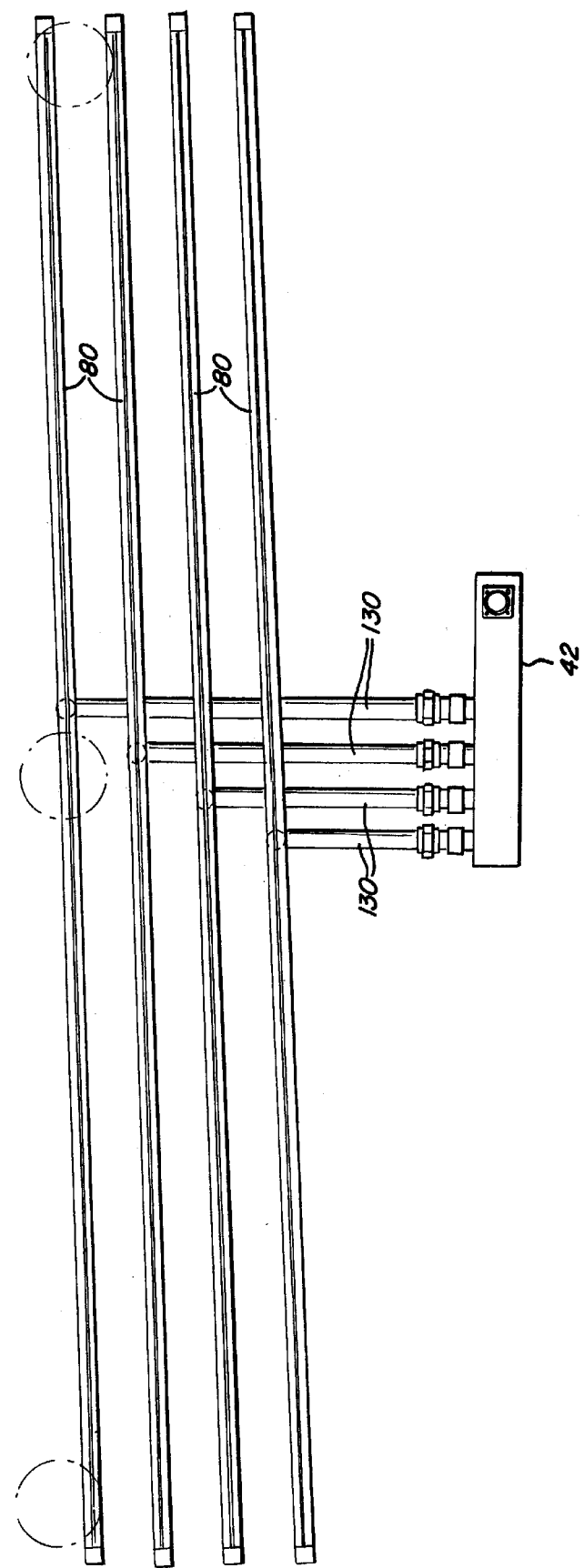

OVEN

BACKGROUND OF THE INVENTION

1. Field of the Invention

The invention relates generally to the field of ovens and dryers.

2. Description of Prior Art

A variety of corn and flour flatbread products, such as tortillas and chips, are made by large, specialized ovens. A standard oven in the flatbread industry consists of multiple decks upon which the products travel as they are being cooked. Each deck typically includes a conveyor belt rotating around several latitudinal cooking burners which extend from one side of an oven to an opposite side.

Many problems exist with current ovens. The latitudinal burners create an uneven heat spectrum across the width of an oven. Since heat tends to escape from the left and right sides of the oven, temperature crests in the center of the oven. Latitudinal burners do not allow for satisfactory temperature adjustment across the width of an oven. Furthermore, latitudinal burners also require long pilot runners that extend substantially throughout the entire length of each deck so as to cover all the latitudinal burners on the deck. Since modern safety codes require pilot runners to keep burning as long as the cooking burners are in use, such pilot runners consume a tremendous amount of BTUs.

Not only do typical ovens consume a great deal of energy, they also require a tremendous amount of time and monetary expense to build. Since several latitudinal burners are required to complete each deck, costs abound in supplying not only the burners themselves, but all the modular components such as fittings necessary to connect the burners to their respective manifolds. For the same reason, expenses are great when connecting extensive pilot burners. More pieces equate to greater complexity which ultimately requires more time and manpower to assemble.

Ovens with latitudinal burners are inefficient. Since a latitudinal burner extends from one side to the other, heat is unnecessarily applied to areas between rows of products. In ovens with belt supports that travel from one side to the other, such as chevron belt supports, heat is also unnecessarily applied to the belt supports.

BRIEF SUMMARY OF THE INVENTION

An oven has an infeed end, an outfeed end, and a horizontal plane. The oven comprises a movable carrier to support a product to be heated. The carrier is movable in a first longitudinal direction between the infeed end and the outfeed end. The oven comprises at least one deck of longitudinal burners disposed on the horizontal plane. Each of the longitudinal burners extends in a second longitudinal direction between the infeed end and the outfeed end. The first longitudinal direction is defined as the direction in which a product would travel as it is being transported by the movable carrier. The second longitudinal direction as well as any subsequent longitudinal directions of any further burners are diagonal to the first longitudinal direction. Since the burners are angled diagonally relative to the direction of movement of the movable carrier, the burners thus extend in a direction slightly diagonal to the path of travel of the product.

A latitudinal pilot runner extends across the deck of longitudinal burners from the a first side of the oven to the opposing second side. A length of the latitudinal pilot runner is substantially less than a length of each longitudinal burner. An infrared burner is disposed above the deck of longitudinal burners. A flexible connector coupled to each longitudinal burner. The flexible connector comprises a bellows.

The longitudinal burners may be substantially parallel with each other. Alternatively, the longitudinal burners may be oriented in a V-formation wherein the back end of each burner is pointed either toward or away from the center longitudinal axis of the oven.

The oven may comprise a plurality of decks of burners wherein each deck is disposed on a horizontal plane. Each horizontal plane has an X-axis in the first longitudinal direction and a Y-axis orthogonal to the X-axis. Each longitudinal burner comprises a front end and a back end. The front end and back end of each the longitudinal burner defines a width span along the Y-axis. The width span of each longitudinal burner substantially covers a cross-dimension of a target product supported by the movable carrier.

The longitudinal burners are adjustable in length. The oven further comprises a control mechanism coupled to each longitudinal burner to individually control a level of combustion for each longitudinal burner. A pressure or temperature gauge may be coupled to each upper longitudinal burner and each lower longitudinal burner.

In another aspect, the invention comprises a deck of burners in an oven. The oven includes a horizontal plane, an infeed end, an outfeed end, and a longitudinal axis on the horizontal plane. The longitudinal axis is defined between a first center point on the infeed end and a second center point on the outfeed end. The deck of burners comprises a first longitudinal burner and a second longitudinal burner. Alternatively, the oven may comprise simply one slanted burner. The first longitudinal burner has a first outfeed end that is horizontally angled from a first infeed end. The first outfeed end and the first infeed end define a first burner axis that is non-parallel with the longitudinal axis. The second longitudinal burner is positioned adjacent to the first longitudinal burner on the horizontal plane. The second burner has a second outfeed end that is horizontally angled from a second infeed end. The second outfeed end and the second infeed end define a second burner axis that is non-parallel with the longitudinal axis. A control mechanism may be coupled to each of the first longitudinal burner and the second longitudinal burner to control a level of combustion for each burner.

In another aspect, the oven comprises a first longitudinal burner disposed on a substantially horizontal plane, a second longitudinal burner disposed on the substantially horizontal plane, a first control mechanism to control a first level of combustion of the first longitudinal burner, and a second control mechanism to control a second level of combustion of the second longitudinal burner. A longitudinal axis on the horizontal plane is defined by a first center point on the front end and a second center point on the back end. The first longitudinal burner has a first infeed end, a first outfeed end, and a first burner axis defined by the first infeed end and the first outfeed end. The first burner axis is non-parallel with the longitudinal axis. The second longitudinal burner has a second infeed end, a second outfeed end, and a second burner axis defined by the second infeed end and the second outfeed end. The second burner axis is non-parallel with the longitudinal axis.

The invention further comprises a method for heating a product with a cross-dimension in an oven having a right side, a left side, an infeed end, and an outfeed end. The method comprises: moving a product in a first longitudinal direction between the infeed end and the outfeed end; placing a burner in a second longitudinal orientation between the infeed end and the outfeed end, the second longitudinal direction being diagonal to the first longitudinal direction; and heating the product with the burner as the product moves along the first longitudinal direction.

The method further comprises the following, each of which may be independent of or in combination with each other: providing a controlling mechanism to vary a combustion level of the burner; coupling a gauge to the burner; providing a latitudinal pilot runner to ignite the burner; adjusting a length of the burner; adjusting a position of a front end of the burner by moving the front end toward a right side or a left side of the oven; and adjusting a position of a back end of the burner by moving the back end toward a right side or a left side of the oven.

In another aspect, the invention comprises a method for cooking products in an oven. The method comprises: moving a first product and a second product in a first longitudinal direction between the infeed end and the outfeed end; placing a first burner on a horizontal plane and in a second longitudinal orientation between the infeed end and the outfeed end, the second longitudinal direction being diagonal to the first longitudinal direction; placing a second burner on the horizontal plane and in a third longitudinal orientation between the infeed end and the outfeed end, the third longitudinal direction being diagonal to the first longitudinal direction; coupling a control mechanism to the first burner to control a level of combustion of the first burner; and coupling a control mechanism to the second burner to control a level of combustion of the second burner.

The method further comprises coupling a first gauge to the first burner and coupling a second gauge to the second burner.

In conclusion, an oven includes single or multiple decks of longitudinal burners extending from an infeed end to an outfeed end of a body. The burners are slanted relative to a direction of a movable carrier such that a product traveling on the carrier will be heated continuously from one side to the other by a burner whose orientation is diagonal to the product's path of travel. Thus, the burners are slanted relative to the direction of the moving product. The proportion of air and gas may be separately controlled for each deck. Furthermore, each burner may be individually controlled and monitored to maintain a desired temperature within the body. Latitudinal pilot runners extend across the width of the oven to ignite and maintain the longitudinal burners. Infrared burners above the top deck initially heat a product to either seal in or eliminate moisture. The invention further comprises a method for heating a product.

Therefore, it can be appreciated that the invention greatly increases efficiency by reducing the number of parts necessary to assemble the oven and by reducing the amount of BTUs used in operating such an oven.

The invention, now having been briefly summarized, may be better visualized by turning to the following drawings wherein like elements are referenced by like numerals.

BRIEF DESCRIPTION OF THE DRAWINGS

FIG. 3c is a top plan view of an alternate embodiment of a deck of burners;

FIG. 3d is a top plan view of a second alternate embodiment of a deck of burners;

The invention and its various embodiments can now be better understood by turning to the following detailed description wherein an illustrated embodiment is described. It is to be expressly understood that the illustrated embodiment is set forth as an example and not by way of a limitation to the invention as defined in the following claims.

DETAILED DESCRIPTION OF THE PREFERRED EMBODIMENTS

An oven 10 illustrated in the figures is designed to heat a variety of products. In the preferred embodiment, the products comprise food, including corn and flour flatbread products, such as chips and tortillas. A variety of non-food products, such as textiles, may be heated in the oven 10.

Figure 1:
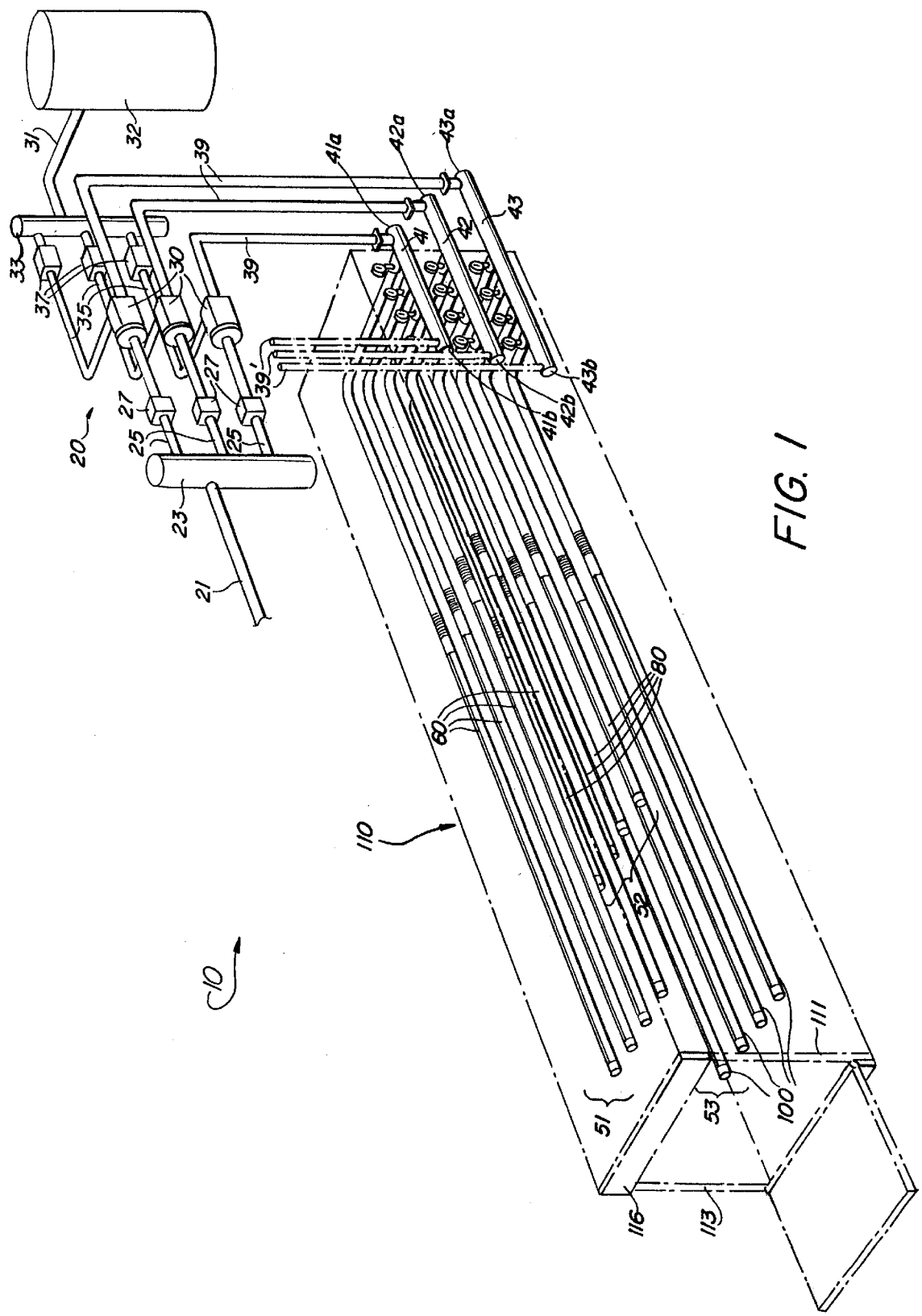
FIG. 1 is a perspective view of an oven.

In FIG. 1, the oven 10 comprises a combustion system 20. The combustion system 20 comprises an air pipe 21 leading from an air supplier to an air manifold 23. Air tubes 25 extend from the air manifold 23 to corresponding mixers 30. Each air tube 25 is coupled with a modulating valve 27 to control the flow of air therethrough. The modulating valve 27 may be manually or computer controlled. The combustion system 20 further comprises a natural gas manifold 33 which receives natural gas from a natural gas supplier 32 via a gas pipe 31. Natural gas includes propane, butane, liquid petroleum and others. A number of gas tubes 35 extend from the natural gas manifold 33 to the mixers 30. The gas tubes 35 are each coupled with a regulator 37 to control the flow of natural gas therethrough. A mixer tube 39 extends from each mixer 30 to a corresponding burner manifold 41, 42, 43. The mixers 30 thus control the proportion of air and natural gas to be distributed to each burner manifold 41, 42, 43 as fuel. It will be appreciated that the number of mixers 30 and burner manifolds 41, 42, 43 correspond to the number of decks within the body 110 of the oven 10. Thus, for each deck 51, 52, 53 of burners 60, 80, 100 a corresponding mixer 30 and burner manifold 41, 42, 43 are provided such that the proportion of air and gas to be supplied as fuel to the burners 60, 80, 100 is separately controlled for each deck 51, 52, 53. The burners 60, 80,100 comprise several types of burners, including ribbon burners, line burners, and more. The body 110 has a first, or left, side 111, a second, or right, side 113, an infeed end 114, and an outfeed end 116.

In the preferred embodiment, each mixer tube 39 is coupled to an infeed end 41a, 42a, 43a of each manifold 41, 42, 43. However, the mixer tubes 39' may be coupled to an outfeed end 41b, 42b, 43b of each manifold 41, 42, 43, as shown by the dashed lines, so as to allow the manifolds 41, 42, 43 to be moved further toward the infeed end 114 of the body 110. Such an arrangement would allow for the longitudinal burners 60, 80, 100 to be lengthened.

Figure 2:
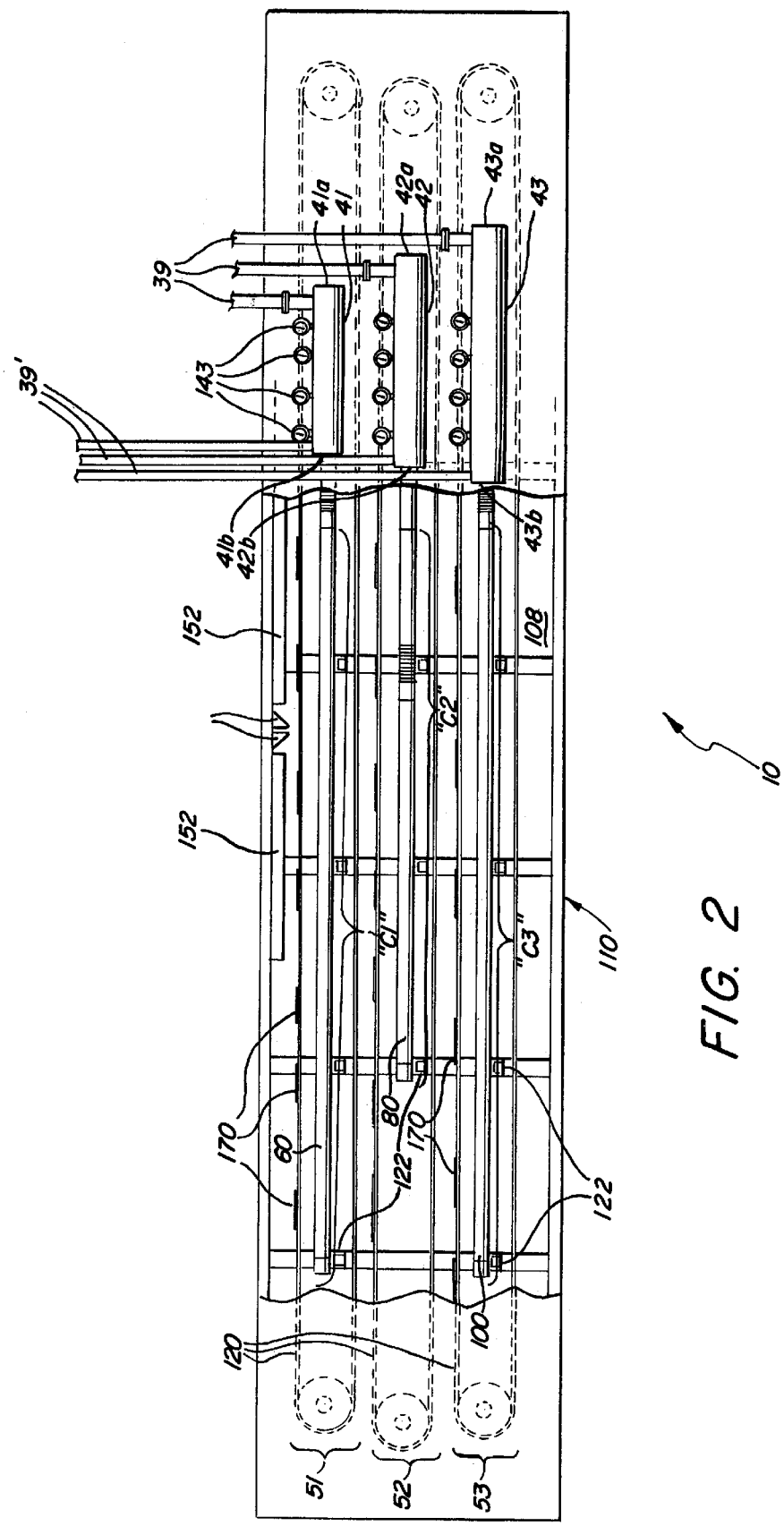
FIG. 2 is a side elevation view of the body of the oven.

FIG. 2 is a side elevation view of showing the interior 108 of the body 110. In the preferred embodiment, three horizontal decks 51, 52, 53 of burners 60, 80, 100 are provided, with each deck 51, 52, 53 comprising four burners 60, 80, 100, respectively. It is to be expressly understood, however, that the oven 10 may comprise any number of decks and any number of burners per deck. Each deck 51, 52, 53 of burners 60, 80,100 lie on a substantially horizontal plane as shown in FIG. 1. The preferred embodiment also includes three burner manifolds 41, 42, 43 corresponding to the three decks 51, 52, 53. Since more or less decks of burners can be provided, the number of burner manifolds may also vary to correspond to the number of decks.

In an alternative embodiment, the oven may comprise merely a single deck with multiple burners. In such an embodiment, the food products will not lose orientation because they will not need to be transferred from one deck to another as in the multiple deck ovens.

Each deck 51, 52, 53 comprises a movable carrier 120 upon which the product to be heated rests. In the preferred embodiment, the movable carrier comprises a conveyor belt 120 that revolves around a row of longitudinal burners 60, 80, 100. The conveyor belts 120 may include rigid, latitudinal metal slats, flexible baking bands, solid continuous baking bands, as well as any other type of bands and belts. Belt supports 122 keep the movable carriers 120 at a fixed height "H" above each corresponding row of burners 60, 80, 100. This height "H" is maintained at a consistent level throughout the length of the deck 51, 52, 53 so as to provide even heating of the product throughout its travel along each deck 51, 52, 53. The conveyor supports 122 include side rails disposed longitudinally adjacent to the first and second side 111, 113 of the body 110 for holding metal slats, as well as slanted members configured to form the shape of chevrons, as shown in FIG. 3c, for holding baking bands.

In FIGS. 1 and 2, the middle deck 52 of burners 80 are shorter than the upper deck 51 of burners 60 and the lower deck 53 of burners 100. One advantage provided by longitudinal burners is that the lengths of burners on each deck may be varied. Thus, depending upon the product to be heated and the amount of heating desired for each deck, the lengths of the burners for each deck may be varied accordingly. In an alternative embodiment, for example, wherein the greatest amount of heating is desired to be performed on the top deck and a lesser amount of heating is desired for each successively lower deck, the oven may comprise a top deck having the longest burners, a middle deck having a medium length of burners, and a bottom deck having the shortest burners.

In FIG. 2, infrared burners 150 are disposed above the top deck 51 of burners 60. The infrared burners 150 face downwardly toward the top conveyor belt 120. Deflecting shields 152 are disposed adjacent to the infrared burners 150. In the preferred embodiment shown in FIG. 2, the infrared burners 150 face downwardly in opposite directions. The infrared burners 150 serve to seal in moisture of a product that is initially being cooked on the upper deck 51. Depending upon the type of product and the amount of heating desired, the infrared burners may also serve to heat the product more intensely thus eliminating moisture in the product. This is desirable for products such as tortilla chips.

Figure 3A:
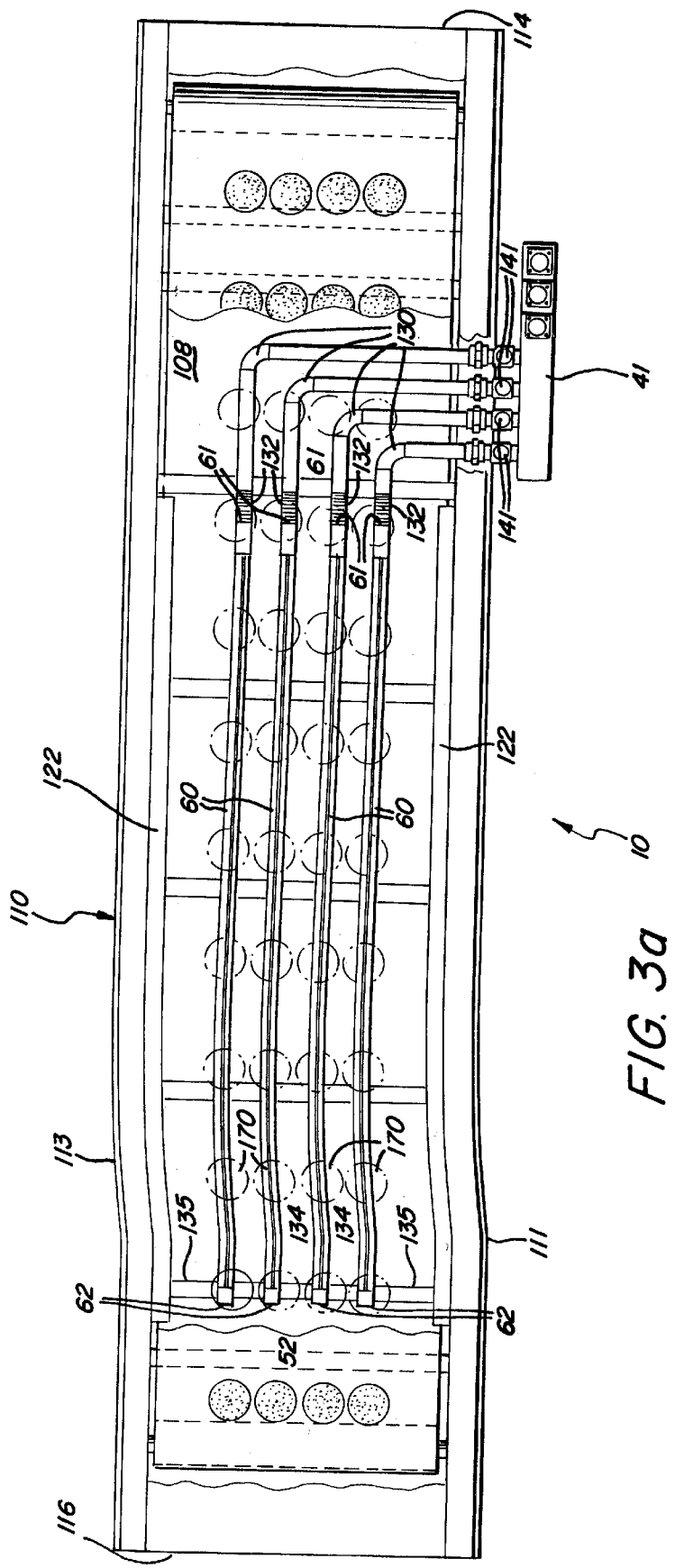
FIG. 3a is a top plan view of the oven with top panels removed to show an interior of the body.

FIG. 3a is top plan view of the interior 108 of the body 110 showing the upper deck 51 of burners 60. Though FIG. 3aonly illustrates the top deck 51, it is to be understood that the middle deck 52 and the lower deck 53 include corresponding structures with corresponding features. A plurality of elbow tubes 130 couple the burners 60 to the manifold 41. Each elbow tube 130 is coupled to an individual burner 60 and the manifold 41. Bellows 132 are disposed between each elbow tube 130 and its corresponding burner 60 to allow for adjustability of the burner 60. The bellows 132 may also be disposed between the elbow tube 130 and the manifold 41.

A regulating burner valve 141 is disposed on each elbow tube 130 exterior to the body 110 to enable an operator to control the heat applied by its corresponding burner 60.

The following features which describe the upper burners 60 also apply to the middle burners 80 and the lower burners 100. The burners 60 extend from the infeed end 114 of the body 110 to the outfeed end 116. The burners 60 are disposed on a substantially horizontal plane and are slanted such that an outfeed, or back, end 62 is angled to the right or left of an infeed, or front, end 61 of each burner 60.

In FIGS. 2 and 3a, each burner 60, 80, 100 is individually coupled to its respective burner manifold 41, 42, 43 and controlled by a regulating burner valve 141. A pressure gauge 143 is disposed adjacent to each valve 141 and exterior to the body 110 such that an operator may read measurements for each individual burner 60, 80, 100 on each deck 51, 52, 53, respectively. Therefore, temperature may be kept more evenly distributed across the width of the oven by adjusting each individual burner to a desired level. For example, traditional ovens suffer from overheating along a center line of the oven because heat tends to escape from the sides of the oven. With longitudinal burners 60, 80, 100 that are each individually controlled by a regulating valve 141 and measured by a pressure gauge 143, burners adjacent to the left and right sides 111, 113 of the oven 10 may be turned up and maintained at a higher temperature than those in the center of the oven 10. The end result is an even heat distribution across the width of the oven 10 that was heretofore unattainable, thus leading to even cooking of the product 170. Furthermore, fewer pilot runners 162 lead to less disturbance of the temperature balance within the body 110.

Figure 4:
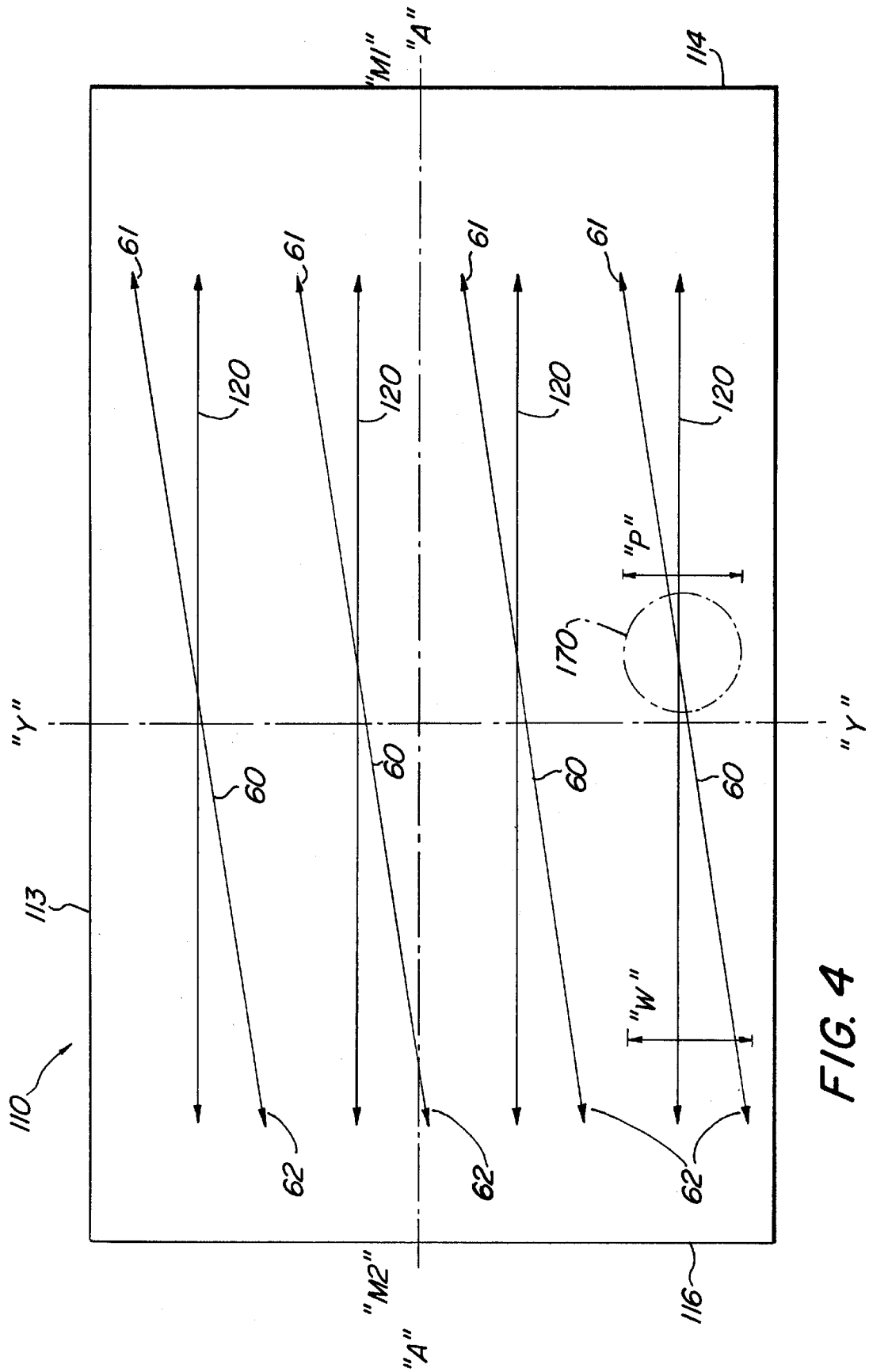
FIG. 4 is a schematic diagram illustrating the slanted orientation of the longitudinal burners relative to the direction of travel of the product along the movable carrier.

FIG. 4 is a schematic top plan diagram of a representative horizontal plane upon which a deck of longitudinal burners are disposed. In particular, FIG. 4 schematically illustrates the diagonal feature of the longitudinal burners 60 relative to the direction of the movable carrier 120. The movable carrier 120 moves in a longitudinal direction between the infeed end 114 and the outfeed end 116 as depicted by the straight, chevron-tipped arrows 120. The burners extend in a slanted longitudinal direction from an infeed end 114 to the outfeed end 116, as depicted by the diagonal, solid-tipped arrows 60. Thus, the longitudinal direction of the burners 60 is diagonal to the longitudinal direction of the movable carrier 120. It will be appreciated then that as a product 170 is being carried by the movable carrier 120, the longitudinal burner 60 heats the entire cross-dimension "P" of the product 170 from one side all the way to the other.

In FIG. 4, a longitudinal axis "A" is defined on the horizontal plane of each deck 51, 52, 53 by a center point, or midpoint, "M1" on the front end 114 of the body and a center point, or midpoint, "M2" on the back end 116. Each single-headed arrow 60 also represents a burner axis defined by the burner's front end 61 and back end 62. Thus, each burner 60 is slanted, or angled, such that its burner axis 60, if extended indefinitely, intersects the longitudinal axis "A". In other words, each burner 60 is oriented in a diagonal fashion such that its burner axis "60" is not parallel with the longitudinal axis "A".

The longitudinal axis "A" may be considered an X-axis of the horizontal plane. Accordingly, a "Y" axis orthogonal to the "A" axis extends from left side 111 to the right side 113 of the oven 10. Each burner 60 is slanted such that it covers a width span "W" along the Y-axis. The width span "W" covered by each burner 60 may be configured to substantially extend across a cross-dimension "P" of the product 170.

In FIG. 3a, the burners 60 are shown to be substantially parallel with one another. The center of each burner 60 is off-centered, or slanted, by roughly two inches. If the width of the burner 60 itself is 4 inches, for example, then each burner 60 would then cover a total width span, or profile, "W" equal to its burner width plus the slant, which in this case would be: 4+2=6. Thus, the width of coverage "W" provided by each burner 60 may be adjusted to accommodate a specific product 170 being heated by varying the width of the burner 60 as well as adjusting the amount of slant. The slant may be adjusted by moving the front end 61 or the back end 62 of each burner 60 to the right or left. The bellows 132 allow the front end 61 to be adjusted. Brackets 134 couple the back ends 62 of the burners 60 to a cross frame 135, as shown in FIG. 3a. The brackets 134 allows the back ends 62 to be adjusted to the right or left.

As products 170 travel along each deck 51, 52, 53 via the conveyor belt 120, they will be heated by the longitudinal burners 60, 80, 100. On the first deck 51 as shown in FIG. 2, the products 170 will also be heated from above by infrared burners 150 so as to seal in its moisture, which is especially important for tortillas. The longitudinal burners 60, 80, 100 can be adjusted sideways so as to cover a width span equal to the diameter of the product 170. Thus, unlike conventional burners, heat will not be wasted on space between the rows of product 170. For products with smaller cross-dimensions, such as tortilla chips, one burner 60 may be slanted to cover every two rows of product.

Longitudinal burners offer a unique advantage in that their lengths may, though not necessarily so, be varied. As a result, the cooking distance per deck, or the portion of a deck during which a product is being heated by a longitudinal burner disposed directly underneath, may be varied. For instance, in FIGS. 1 and 2, the preferred embodiment shows a middle deck 52 of burners 80 that are shorter than the top burners 60 and the bottom burners 100. This results in a shorter cooking distance "C2" than the upper cooking distance "C1" and the lower cooking distance "C3". The products 170, therefore, will be heated for a longer duration on the top deck 51 and the bottom deck 53 than on the middle deck 52. By adjusting the length of the burners per deck, the amount of heating performed per deck is correspondingly adjusted, thus customizing the level of moisture and texture desired for a product.

Figure 3B:
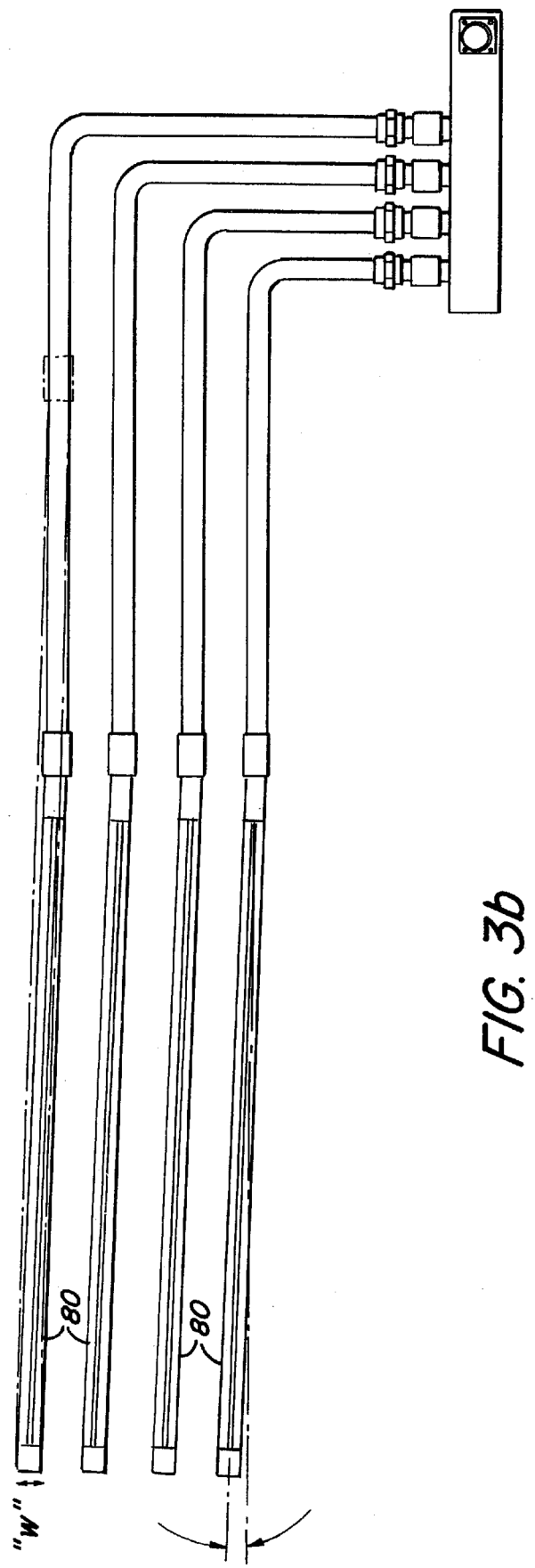
FIG. 3b is a top plan view of a middle deck of shortened burners.

In FIG. 3b, the length of the middle longitudinal burners 80 is shortened by removing a portion of each burner 80. As a result, the shortened burner 80 must be slanted to a greater degree in order to cover the same width span "W" as a non-shortened burner, as illustrated in hidden view lines for comparison. Therefore, the embodiment shown in FIGS. 1 and 2 offers a unique advantage of being able to initially heat a product 170 more extensively on the upper deck 51, thus sealing in moisture, while reducing the amount of cooking in the middle deck 52 to avoid overcooking the product. It is to be understood that any deck of burners may be shortened to obtain a desired result for a particular product.

FIG. 3c shows an alternate configuration of burners 60 wherein the back end 62 of each burner 60 is slanted toward the longitudinal axis "A" of the oven 10 so as to form a "V", or chevron, configuration of burners 60. Such an arrangement of burners 60 is preferable in an oven 10 with chevron belt supports 122. Unlike traditional ovens having latitudinal burners, the longitudinal burners 60 may be configured to extend alongside and substantially parallel to a belt support 122 such that heat is not being applied directly to the belt support 122 disposed above. Such an arrangement increases efficiency by transferring heat to the product and minimizing the amount of heat absorbed by the belt support 122. In such an embodiment, a pilot system would include a longitudinal pilot runner 182 and a latitudinal pilot runner 184 to sufficiently cover the burners 60.

FIG. 3d illustrates a row of burners in an alternative embodiment wherein the burners 80 are coupled to the manifold 42 by tubes 130 that are attached adjacent to a middle section of each burner 80. The tubes 130 are coupled to a bottom portion of each burner 80.

Figure 5:
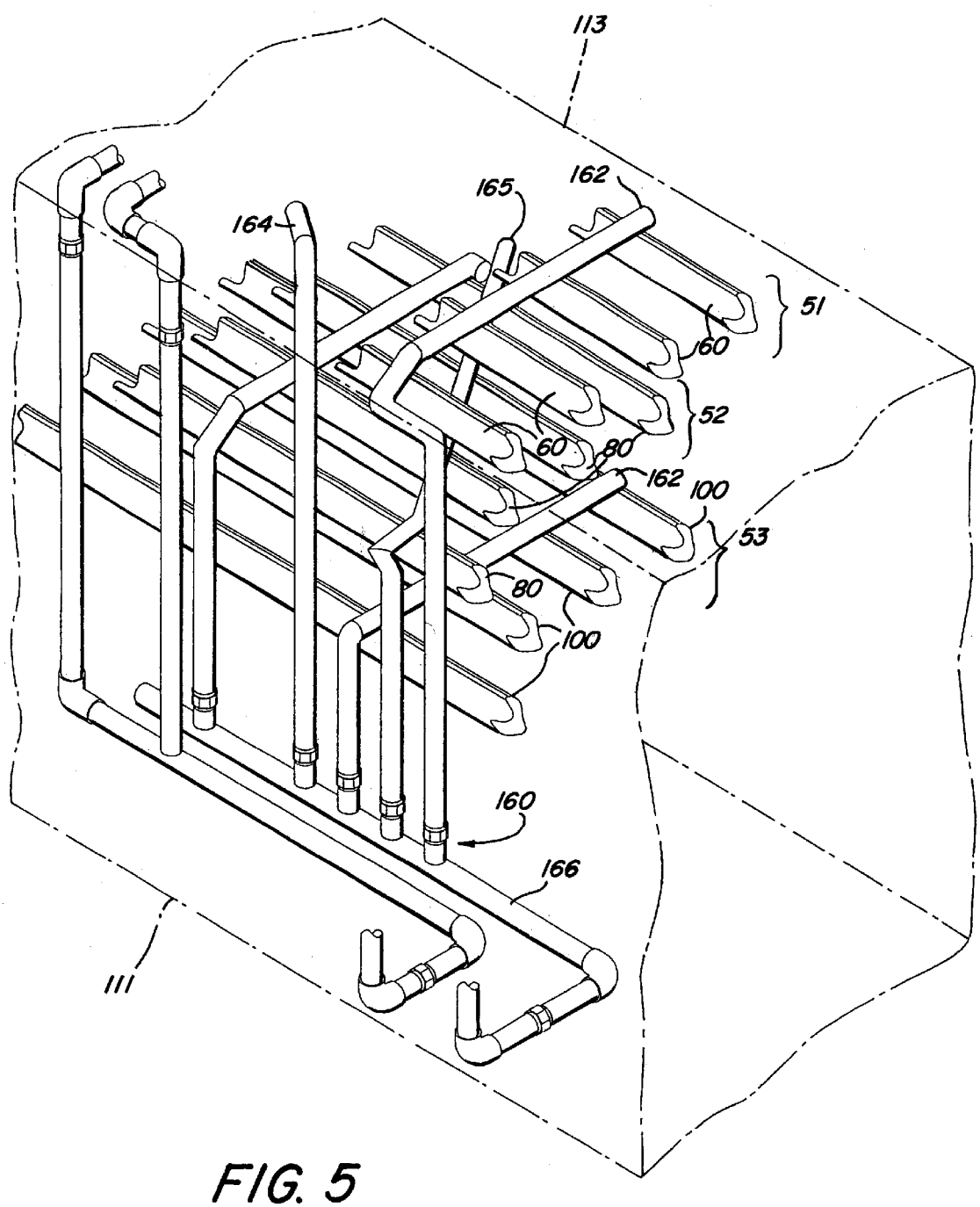
FIG. 5 is a perspective view of the interior of the body illustrating the pilot runners and the longitudinal burners.

In FIG. 5, a pilot system 160 is provided that is much more efficient than those of the prior art. Rather than extending longitudinally as in conventional ovens which have latitudinal burners, the pilots runners 162 extend latitudinally from the first side 111 of the body 110 to the opposing second side 113, as shown in FIG. 5. The result is that latitudinal pilot runners 162 are much shorter in length than conventional, longitudinal pilot runners. Only one pilot runner is necessary to cover each deck 51, 52, 53 of burners 60, 80, 100. An infrared pilot runner 164 extends to the infrared burners. The latitudinal pilot runners 162 and infrared pilot runners 164 are easier to assemble due to their decreased length and increased simplicity. More importantly, since shorter pilot runners are required to ignite the longitudinal burners 60, 80, 100 the pilot burners consume remarkably less BTUs than the those of the prior art, especially when they are required to burn while the longitudinal burners are in operation. The pilot runners 162 extend upwardly from a base pilot pipe 166 at a height sufficiently above the corresponding decks 51, 52, 53. A vertically diagonal pilot runner 165 may be provided to ignite burners 60, 80, 100 on different decks 51, 52, 53. It will be appreciated that the pilot runners 162 have a length that is substantially shorter than the lengths of the longitudinal burners 60, 80, 100. In an alternative embodiment, spark igniters may be used instead of pilot runners. The advantage of having a separate pilot runner 162 for each deck 51, 52, 53 is that the pilot runner 162 for each deck may be individually controlled.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The claims are thus to be understood to include what is specifically illustrated and described above, what is conceptionally equivalent, what can be obviously substituted and also what essentially incorporates the essential idea of the invention.

What is claimed is:

1. An oven having an infeed end, an outfeed end, and a horizontal plane, the oven comprising:

a movable carrier to support a product to be heated, the carrier being movable in a first longitudinal direction between the infeed end and the outfeed end;

a deck of longitudinal burners disposed on the horizontal plane, each of the longitudinal burners extending in a second longitudinal direction between the Infeed end and the outfeed end; and an infrared burner disposed above the deck of longitudinal burners, wherein the second longitudinal direction is diagonal to the first longitudinal direction.

2. An oven having an infeed end, an outfeed end, and a horizontal plane, the oven comprising:

a movable carrier to support a product to be heated, the carrier being movable in a first longitudinal direction between the infeed end and the outfeed end; and a deck of longitudinal burners disposed on the horizontal plane, each of the longitudinal burners extending in a second longitudinal direction between the infeed end and the outfeed end, wherein the second longitudinal direction is diagonal to the first longitudinal direction, and wherein the longitudinal burners are oriented in a V-formation.

3. An oven having an infeed end, an outfeed end, and a horizontal plane, the horizontal plane having an X-axis in the first longitudinal direction and a Y-axis orthogonal to the X-axis, the oven comprising:

a movable carrier to support a product to be heated, the carrier being movable in a first longitudinal direction between the infeed end and the outfeed end; and a deck of longitudinal burners disposed on the horizontal plane, each of the longitudinal burners extending in a second longitudinal direction between the infeed end and the outfeed end, wherein the second longitudinal direction is diagonal to the first longitudinal direction, wherein each longitudinal burner comprises a front end and a back end, the front end and back end of each the longitudinal burner defining a width span along the Y-axis, and wherein the width span of each longitudinal burner does not overlap a width span of an adjacent longitudinal burner.

4. A method for heating a product in an oven, the oven having a right side, a left side, an infeed end, and an outfeed end, the product having a cross-dimension, the method comprising:

moving a product in a first longitudinal direction between the infeed end and the outfeed end;

placing a burner in a second longitudinal orientation between the infeed end and the outfeed end, the second longitudinal direction being diagonal to the first longitudinal direction;

adjusting a length of the burner; and heating the product with the burner as the product moves along the first longitudinal direction.

5. A method for heating a product in an oven, the oven having a right side, a left side, an infeed end, and an outfeed end, the product having a cross-dimension, the method comprising:

moving a product in a first longitudinal direction between the infeed end and the outfeed end;

placing a burner in a second longitudinal orientation between the infeed end and the outfeed end, the second longitudinal direction being diagonal to the first longitudinal direction;

adjusting a position of a front end of the burner by moving the front end toward a right side or a left side of the oven; and heating the product with the burner as the product moves along the first longitudinal direction.

6. A method for heating a product in an oven, the oven having a right side, a left side, an infeed end, and an outfeed end, the product having a cross-dimension, the method comprising:

moving a product in a first longitudinal direction between the infeed end and the outfeed end;

placing a burner in a second longitudinal orientation between the infeed end and the outfeed end, the second longitudinal direction being diagonal to the first longitudinal direction;

adjusting a position of a back end of the burner by moving the back end toward a right side or a left side of the oven; and heating the product with the burner as the product moves along the first longitudinal direction.

* * * * *